United States Patent
Ogura (10) Patent No.: US 8,289,465 B2
(45) Date of Patent: Oct. 16, 2012

(54) LIQUID CRYSTAL DISPLAY DEVICE COMPRISING A FRONT CABINET WITH A SURROUNDING RIB AND POSITIONING RIBS AT A BACK SURFACE SIDE

(75) Inventor: Kenji Ogura, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 720 days.

(21) Appl. No.: 12/239,056

(22) Filed: Sep. 26, 2008

(65) Prior Publication Data

US 2009/0079902 A1 Mar. 26, 2009

(30) Foreign Application Priority Data

Sep. 26, 2007 (JP) ................................. 2007-248540

(51) Int. Cl.
*G02F 1/1333* (2006.01)
(52) U.S. Cl. ......................................................... 349/58
(58) Field of Classification Search ...................... 349/58
See application file for complete search history.

(56) References Cited

U.S. PATENT DOCUMENTS

| | | | | |
|---|---|---|---|---|
| 6,421,231 B1 * | 7/2002 | Jung | ........................ | 361/679.27 |
| 2003/0227581 A1 | 12/2003 | Sung et al. | ....................... | 349/58 |
| 2004/0012729 A1 * | 1/2004 | Kim | ................ | 349/58 |
| 2004/0246397 A1 * | 12/2004 | Kang et al. | ....................... | 349/58 |
| 2005/0141245 A1 * | 6/2005 | Sugahara et al. | ............. | 362/633 |
| 2006/0023141 A1 * | 2/2006 | Oka | ................ | 349/58 |

FOREIGN PATENT DOCUMENTS

| | | |
|---|---|---|
| JP | 57-161289 | 10/1982 |
| JP | 61-180 | 1/1986 |
| JP | 61-112383 | 7/1986 |
| JP | 61-165575 | 10/1986 |
| JP | 2001-356324 | 12/2001 |
| JP | 3118676 | 1/2006 |
| JP | 2006-189856 | 7/2006 |
| WO | WO 2005/017858 A1 | 2/2005 |

* cited by examiner

*Primary Examiner* — Mark Robinson
*Assistant Examiner* — Dennis Y Kim
(74) *Attorney, Agent, or Firm* — Morgan, Lewis & Bockius LLP (57) ABSTRACT

A liquid crystal display device, includes: a liquid crystal module in which a liquid crystal cell is arranged in a rear frame that is made by metal and has a rectangular box shape; a front cabinet which has a rectangular frame shape and has a window portion in central part thereof; and a plurality of protruding portions for fixing which have rectangular shape, protruding toward outside from side surfaces that form shorter sides and longer sides of the rear frame, and fastened on to the front cabinet by screws, wherein the front cabinet includes at back surface side thereof: a first positioning rib which contacts with at least an outer peripheral part opposing to the longer side of the rear frame of one of the protruding portions for fixing that protrudes from the longer side of the rear frame, and a second positioning rib which contacts with at least an outer peripheral part opposing to the shorter side of the rear frame of one of the protruding portions for fixing that protrudes from the shorter side of the rear frame.

6 Claims, 6 Drawing Sheets

LIQUID CRYSTAL DISPLAY DEVICE COMPRISING A FRONT CABINET WITH A SURROUNDING RIB AND POSITIONING RIBS AT A BACK SURFACE SIDE

This application is based on Japanese Patent Application No. 2007-248540 filed on Sep. 26, 2007, the contents of which are hereby incorporated by reference.

BACKGROUND OF THE INVENTION

1. Field of the Invention

The present invention relates to a liquid crystal display device in which a liquid crystal module can be mounted easily.

2. Description of Related Art

A liquid crystal display device has feature that it is thin type, light weight and low power consumption, and is widely used as a display device to display image such as a PC monitor, a television receiver and the like.

Figure 8:
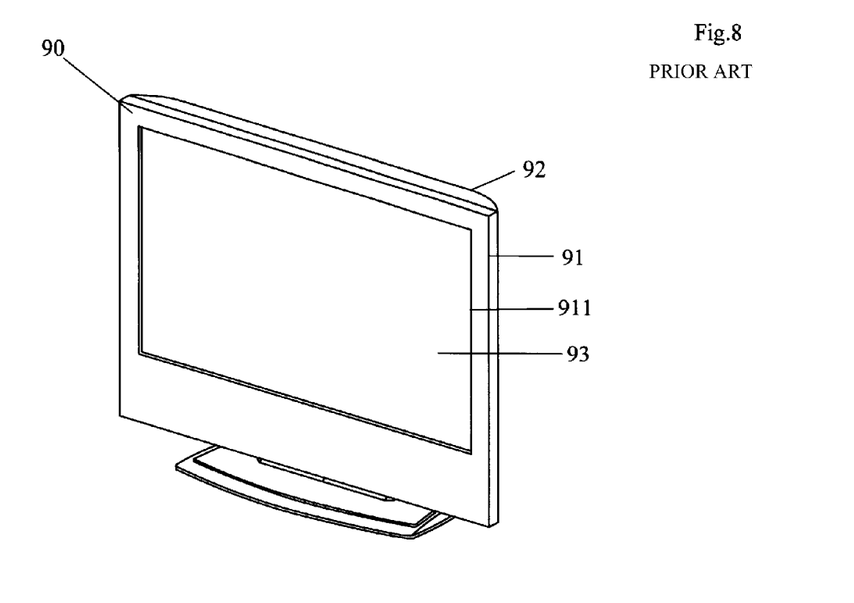
FIG. 8 is a perspective view of the liquid crystal display device.
Figure 9:
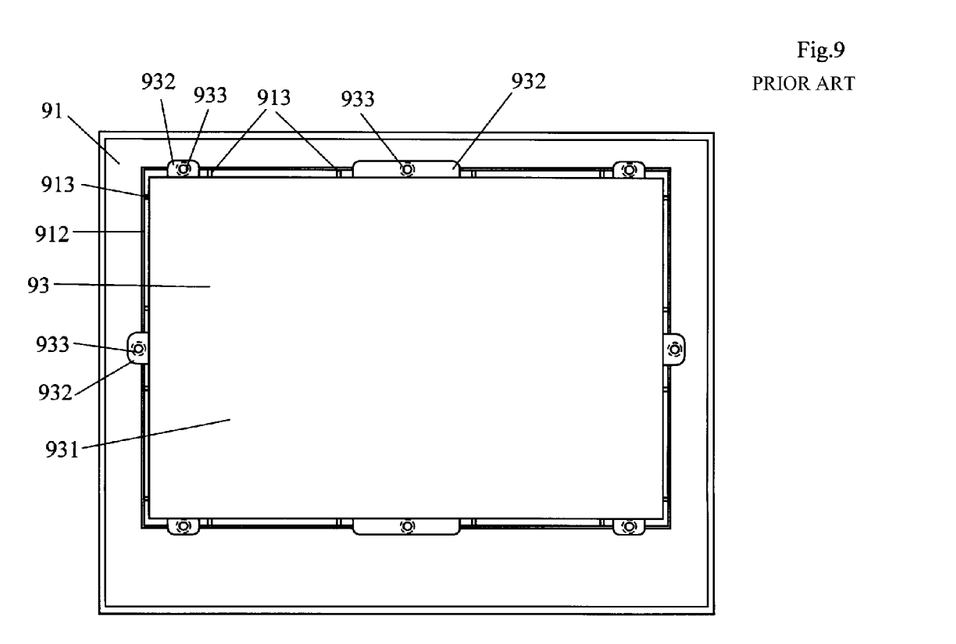
FIG. 9 is a rear view of conventional liquid crystal display device in a state where a rear cabinet is taken away.

FIG. 8 is a perspective view of a general liquid crystal display device, and FIG. 9 is a rear view of a conventional liquid crystal display device in a state where a rear cabinet is taken away. The cabinet 90 is provided with a front cabinet 91 and a rear cabinet 92. A liquid crystal module 93 to display image is stored and held in an inner space which is formed by the front cabinet 91 and the rear cabinet 92. As shown in FIG. 8, in the front cabinet 91 an opening portion 911 to expose an effective display area of the liquid crystal module 93 is formed.

As shown in FIG. 9, Display devices such as a backlight, a liquid crystal cell are arranged inside of the rear frame 931 of the liquid crystal module 93 which has side wall portion that stands from an outer peripheral portion of back surface having a rectangular shape. A depression portion 912 is formed in a back surface side of the front cabinet 91, the depression portion 912 surrounds an outer periphery of the opening portion 911 and the liquid crystal module 93 is arranged in the depression portion 912. On an inner wall portion of the depression portion 912, a plurality of ribs 913 to contact and support the liquid crystal module 93 are provided.

On a side wall portion of the rear frame 931, a plurality of ribs for fixing 932 which protrude toward outside are provided. In the rib for fixing 932 a through hole 933 is formed. The liquid crystal module 93 is arranged on the depression portion 912, and the effective display area is confirmed to be accurately exposed from the opening portion 911. Then, screws are inserted into the through holes 933 of the rib for fixing 932 and screwed into screw holes which are formed on the front cabinet 91, and the liquid crystal module 93 is consequently fixed on the front cabinet 91.

The rear cabinet 92 covers the liquid crystal module 93 from back surface side and it is arranged such that its outer peripheral portion is overlapped with an outer peripheral portion of the front cabinet 91, and the rear cabinet 92 is fastened by screws with the front cabinet 91.

Fine adjustment of positioning is required to arrange the liquid crystal module 93 such that the effective display area is exposed from the opening portion 911 of the front cabinet 91 with enough accuracy. Rough positioning can be performed by arranging the liquid crystal module 93 in the depression portion 912 such that the rib 913 of the depression portion 912 is contacted with a side wall portion of the liquid crystal module 93. However, the fine adjustment of positioning with respect to the front cabinet 91 and the liquid crystal module 93 takes a lot of trouble because it must be performed while positions of the opening portion 911 and the effective display area are confirmed from front side.

Therefore, JP-A-2006-189856 discloses an invention in which a fixing member is arranged on each of opposing side surfaces of a display panel, and a plurality of protruding portions are arranged in a line on a side surface of the fixing member. In the invention, each of the protruding portions are arranged in each of step portions formed by a front case and a rear case, and positioning and fixing are performed by fixing the front case, the protruding portions and the rear case by screws.

Further, WO2005/017858 discloses an invention in which elastically deformable bosses formed in a back surface side of a frame-like front surface portion are passed through depression portions formed around screw holes in a display panel, elastically deformable portions of each of the bosses are contacted with side walls of each of the depression portions, and the positioning is consequently performed.

However, in the invention disclosed in JP-A-2006-189856, the step portions in which the protruding portions of the fixing member are arranged must be formed with respect to each of the protruding portions on at least one of the front case and the rear case in order to make the front case and the rear case contact closely, and structure of the front case and/or the rear case become as a result complicated.

Further, in the invention disclosed in WO2005/017858, because the bosses must be formed such that the bosses can pass through the depression portions and the elastically deformable portions can elastically contact with the side walls of the depression portions, the shape consequently becomes very complicated. Further, the bosses are relatively small members in comparison with the liquid crystal display device, and there is as a result possibility of deformation or breakage thereof when large force is applied thereto for falling, vibration or the like.

SUMMARY OF THE INVENTION

It is an object of the present invention to provide a liquid crystal display device in which positioning between a liquid crystal module and an exterior cabinet can be accurately performed without necessity of members which has complicated structure or bothersome positioning operation.

It is another object of the present invention to provide a liquid crystal display device which has simple structure and in which the cabinet can hold stably the liquid crystal module even when a force from the liquid crystal module is applied to the cabinet for falling, vibration or the like.

A liquid crystal display device according to a first aspect of the present invention, includes: a liquid crystal module in which a liquid crystal cell is arranged in a rear frame that is made by metal and has a rectangular box shape; a front cabinet which has a rectangular frame shape and has a window portion in central part thereof; and a plurality of protruding portions for fixing which have rectangular shape, protruding toward outside from side surfaces that form shorter sides and longer sides of the rear frame, and fastened on to the front cabinet by screws, characterized in that a display portion of the liquid crystal cell is exposed from the window portion, the front cabinet includes at back surface side thereof: a first positioning rib which contacts with at least an outer peripheral part opposing to the longer side of the rear frame of one of the protruding portions for fixing that protrudes from the longer side of the rear frame, and a second positioning rib which contacts with at least an outer peripheral part opposing to the shorter side of the rear frame of one of the protruding portions for fixing that protrudes from the shorter side of the rear frame.

According to this arrangement, because the protruding portions for fixings which are formed on the longer sides and the shorter sides are held, it is possible to easily position. Further, because not all of the ribs for fixing are positioned, even in case where there is an error in shape of the protruding portions for fixing in regard to the designed shape, the liquid crystal module can be positioned easily.

Further, because of including the positioning rib, the liquid crystal module can be positioned in accurate position only by accessing from back surface side of the front cabinet. As a result, assembling of the liquid crystal module to the front cabinet can be performed simply and easily. Production process can be consequently reduced and it becomes possible to reduce cost.

In the preferred embodiment of the present invention, the second positioning rib may be formed in U shape so as to contact with three sides of an outer peripheral part of the one of the protruding portions for fixing.

In the preferred embodiment of the present invention, the first positioning rib may be formed so as to contact with the one of the protruding portions for fixing that is adjacent to a corner part of the rear frame, and the second positioning rib may be formed so as to contact with the one of the protruding portions for fixing that is formed so as to be adjacent to the protruding portion for fixing being adjacent to the first positioning rib to sandwich the corner part.

According to this arrangement even in case where the liquid crystal display device is fallen down when, for example, it is carried, and a force is concentrated and applied on the corner part, because the first positioning rib and the second positioning rib receive the force from the protruding portion for fixing, it becomes possible to prevent occurrence of deforming, and breakage of the front cabinet.

In the preferred embodiment of the present invention, a surrounding rib into which a front surface side of the liquid crystal module is inserted may be formed at back surface side of the front cabinet, and the first positioning rib and the second positioning rib may be formed longer than the surrounding rib.

DESCRIPTION OF THE PREFERRED EMBODIMENTS

Figure 1:
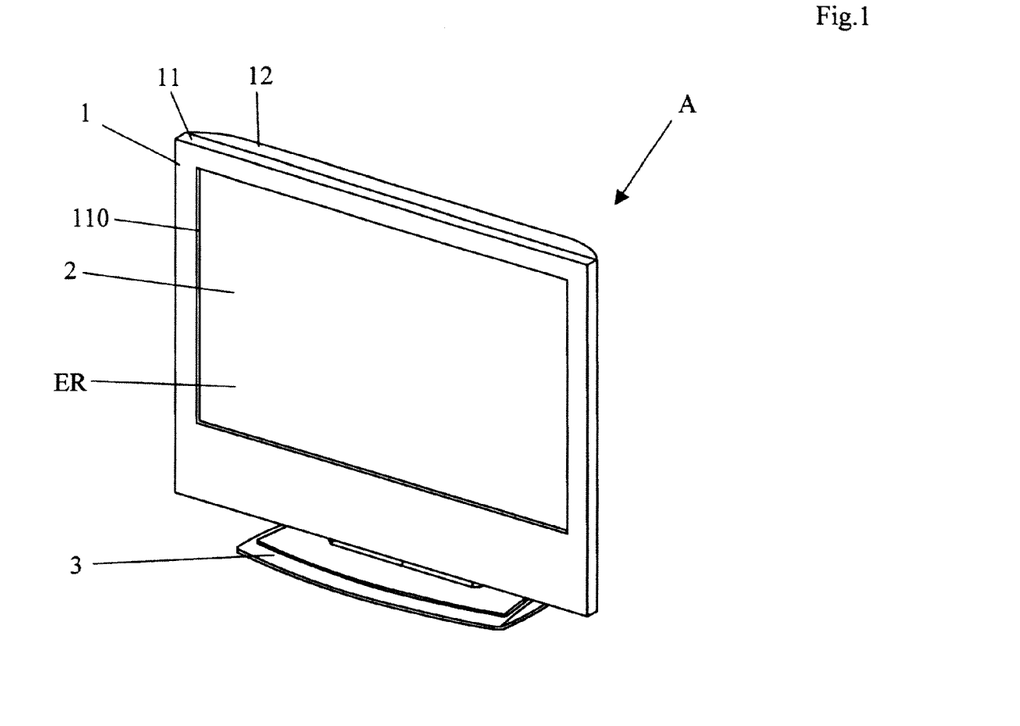
FIG. 1 is a perspective view of a liquid crystal display device when viewed from front side.
Figure 2:
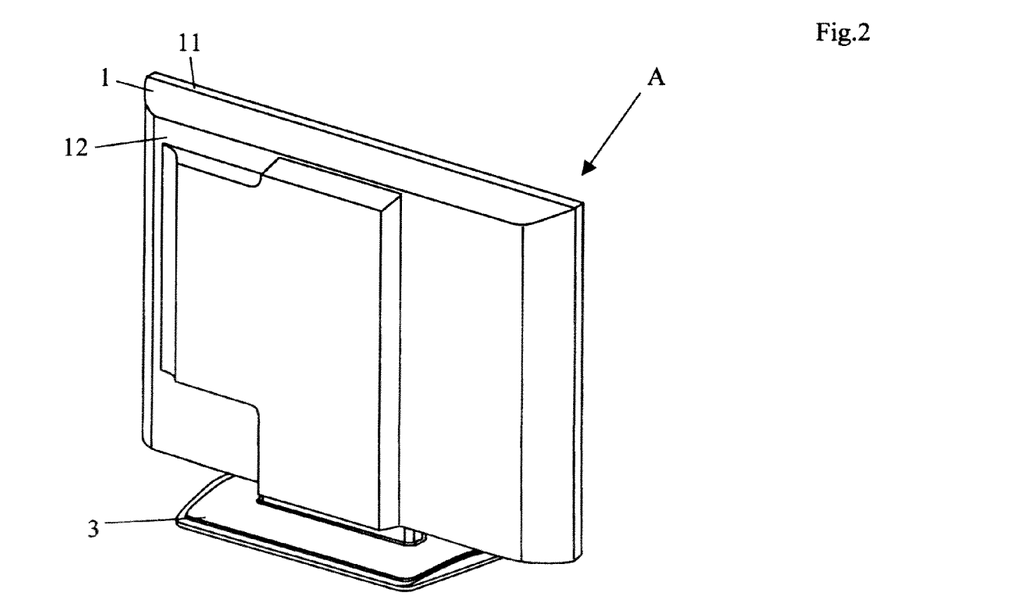
FIG. 2 is a perspective view of the liquid crystal display device shown in FIG. 1 when viewed from back surface side.

Hereinafter, embodiment of the present invention will be explained with reference to the drawings. FIG. 1 is a perspective view of a liquid crystal display device when viewed from front side and FIG. 2 is a perspective view of the liquid crystal display device shown in FIG. 1 when viewed from back surface side. As shown in FIG. 1 and FIG. 2, the liquid crystal display device A is provided with at least a cabinet 1, a liquid crystal module 2, and a stand 3.

The cabinet 1 has a shape which can be divided in front and rear, and it is provided with a front cabinet 11 and a rear cabinet 12. The front cabinet 11 is a frame body which has a rectangular shape and in which a window portion 110 is formed to expose forward an effective display area (area where image is displayed) of the liquid crystal module 2. The rear cabinet 12 is a member having box like shape which is arranged at back surface side of the front cabinet 11, and it is formed so that outer edge portion of it overlaps on the front cabinet 11 with good accuracy. The front cabinet 11 and the rear cabinet 12 are made by resin casting in this embodiment, however, they are not limited only to that.

The stand 3 is a leg member to support the cabinet 1. As shown in FIG. 1 and FIG. 2, the liquid crystal display device A is arranged to stand straight by the stand 3, and a display area of the liquid crystal module 2 is arranged to stand straight. In the below explanation, directions (leftward and rightward direction, upward and downward direction) of the liquid crystal display device A is based on a state where it is viewed in the stand straight state and from back surface side as far as another description is not given.

Figure 3:
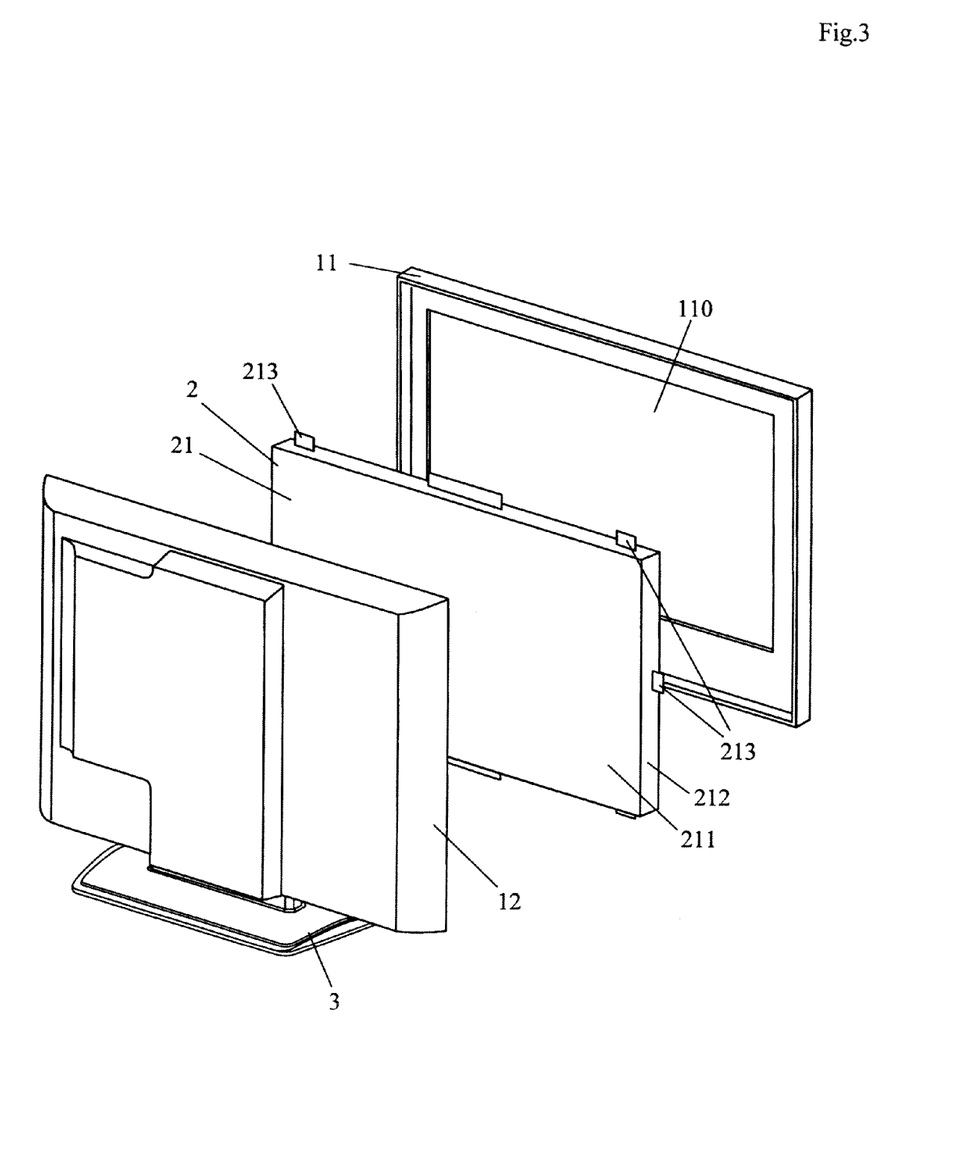
FIG. 3 is an exploded perspective view of a liquid crystal display device in accordance with the present invention.

FIG. 3 is an exploded perspective view of the liquid crystal display device in accordance with the present invention. As shown in FIG. 3, in the liquid crystal display device A, the front cabinet 11 which composes a front part of the cabinet 1 and the rear cabinet 12 which composes a rear part of the cabinet 1, are arranged in forward and backward. The liquid crystal module 2 is arranged such that it is sandwiched by the front cabinet 11 and the rear cabinet 12.

Figure 4:
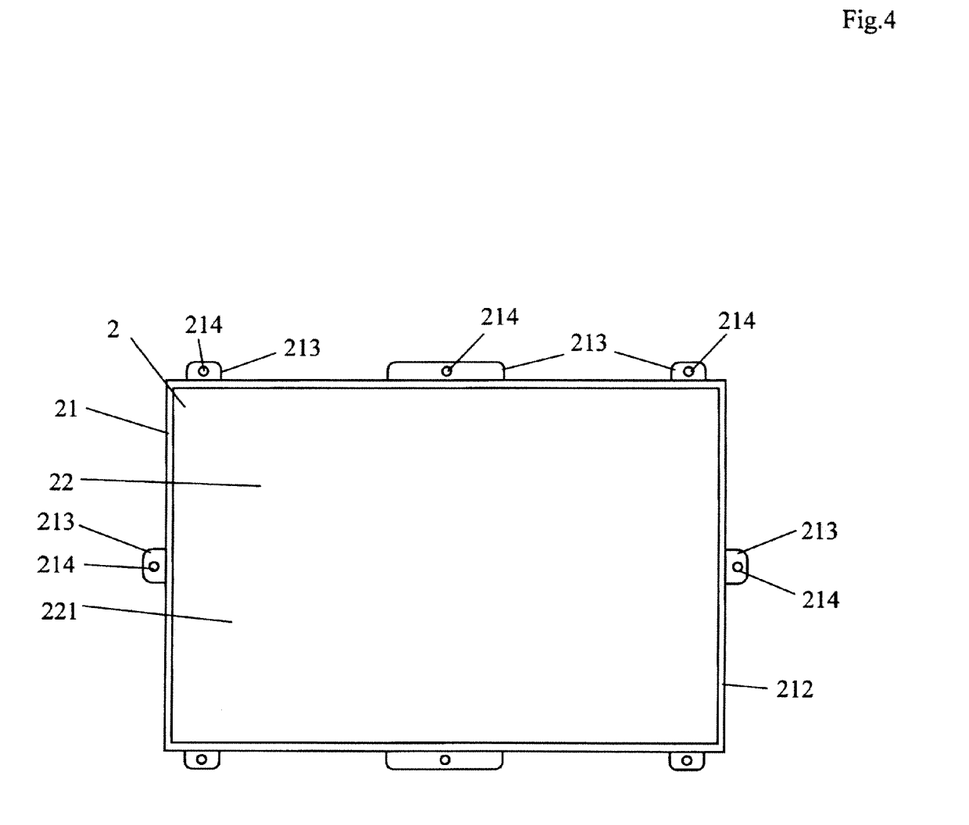
FIG. 4 is a front view of a liquid crystal module.

As shown in FIG. 3, a rear frame 21 has a rectangular box like shape which is formed by cutting and bending a metal plate. The rear frame 21 is provided with a back surface portion 211 which has a rectangular shape, side wall portion 212 which is formed by bending four sides of the back surface portion 211, and protruding portions for fixing 213 which are formed by bending end portions of the side wall portion 212 toward outside. FIG. 4 is a front view of the liquid crystal module. The liquid crystal module 2 is provided with the rear frame 21 and a liquid crystal cell 22. As shown in FIG. 4, the protruding portions for fixing 213 are formed totally three at both ends parts and central part of upper and lower longer side portions respectively, and one each at central part of left and right shorter side portions of the rear frame 21, respectively. In the protruding portion for fixing 213, a through hole 214 is formed.

The liquid crystal cell 22 is inserted in the rear frame 21. The liquid crystal cell 22 is provided with a display portion 221 for displaying image on the front side. In the liquid crystal cell 22, a pair of glass substrates (not shown) which have transparent electrodes (not shown) with respect to each pixel are arranged in parallel, and liquid crystal (not shown) is filled between the glass substrates. Electric power is supplied to the transparent electrodes and voltage is applied to the liquid crystal to drive the liquid crystal. Further, a backlight (not shown) is arranged at back surface side of the transparent electrodes, light emitted from the backlight is transmitted or cut off by the liquid crystal cell, and image is consequently displayed on the display portion 221 in the front side of the liquid crystal cell 22.

Figure 5:
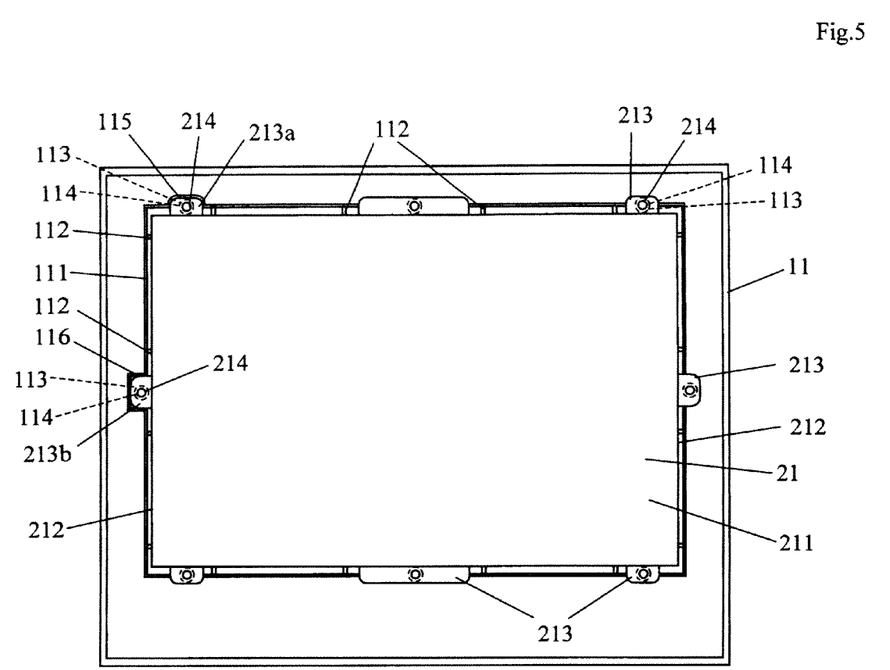
FIG. 5 is a rear view of the liquid crystal display device shown in FIG. 2 in a state where a rear cabinet is taken away.

FIG. 5 is a rear view of the liquid crystal display device shown in FIG. 2 in a state where a rear cabinet is taken away. As shown in FIG. 5, the liquid crystal module 2 can be arranged in back surface side of the front cabinet 11. In the back surface side of the front cabinet 11, a surrounding rib 111 which is formed so as to face to the side wall portion 212 of the rear frame 21 is formed. The surrounding rib 111 is formed so as to surround the window portion 110. In the surrounding rib 111, supporting protruding portions 112 which protrude toward inside, are formed. The supporting protruding portions 112 contact with the side wall portion 212 of the rear frame 21 to support the rear frame 21. The supporting protruding portions 112 are formed four at each of upper side and lower side so as to contact with the longer side of the rear frame 21, and also the supporting protruding portions 112 are formed four at each of left side and right side so as to contact with the shorter side of the rear frame 21.

As shown in FIG. 5, in the liquid crystal module 2, the protruding portions for fixing 213 are arranged so as to extend over the back surface side of the surrounding rib 111. In the front cabinet 11, protruding portions 113 which have cylindrical shape are formed at positions where they overlap with the through holes which are formed in the protruding portions for fixing 213 of the liquid crystal module 2, and a screw hole 114 is formed at center of the protruding portion 113 so that it can hold a screw. The screw is passed through the through hole 214 in the protruding portion for fixing 213 from back surface side, and the screw is screwed together with the screw hole 114, and the liquid crystal module 2 is consequently fixed on the front cabinet 11. The through hole 214 is formed so as to have a radius that is larger than outer radius of the screw body and that is smaller than outer radius of head portion of the screw in order that fine adjustment of positioning of the liquid crystal module 2 can be performed in a state where the screw is passed through.

As shown in FIG. 5, a first positioning rib 115 which contacts with upper part of the protruding portion for fixing 213a that is formed on upper left end part of the liquid crystal module 2, is formed on upper left end part of the surrounding rib 111. Further, a second positioning rib 116 which contacts with upper part, lower part, and left part of the protruding portion for fixing 213b that is formed on the center of left side of the liquid crystal module 2, is formed on central part of left side of the surrounding rib 111.

Figure 6:
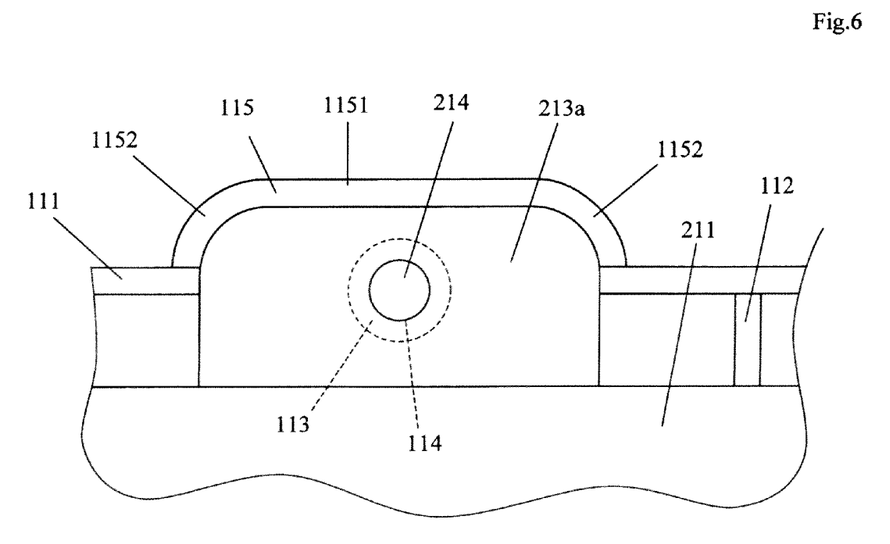
FIG. 6 is an enlarged rear view of a first positioning rib.
Figure 7:
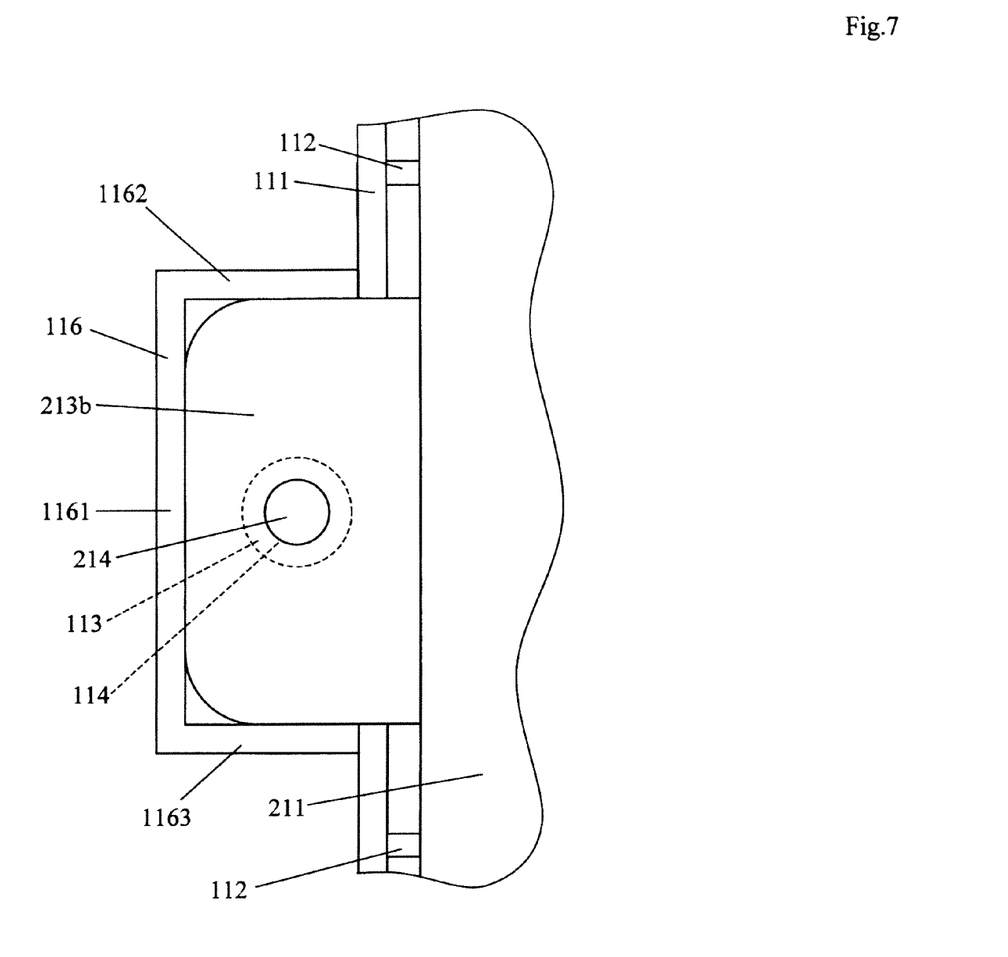
FIG. 7 is an enlarged rear view of a second positioning rib.

Further explanation will be given about the first positioning rib 115 and the second positioning rib 116 in detail. FIG. 6 is an enlarged rear view of the first positioning rib, and FIG. 7 is an enlarged rear view of the second positioning rib. As shown in FIG. 6, the first positioning rib 115 is a rib which protrudes longer than the surrounding rib 111 from back surface side of the front cabinet 11. The first positioning rib 115 is provided with a straight portion 1151 which extends to left side and right side and curved portions 1152 which connect with both end portions of the straight portion 1151 and which curves to downward. The straight portion 1151 contacts with upper part of the protruding portion for fixing 213a, and the curved portion 1152 contacts with curved line portion which is formed on both ends of upper part of the protruding portion for fixing 213a, respectively without space.

As shown in FIG. 7, the second positioning rib 116 is a rib which protrudes longer than the surrounding rib 111 from back surface side of the front cabinet 11 the same as the first positioning rib 115. The second positioning rib 116 has a U shape which opens at right side, and it is provided with a left side portion 1161, an upper side portion 1162 which is integrally connected with the upper end part of the left side portion 1161 at a right angle and extends to right side of the left side portion 1161, and a lower side portion 1163 which is connected with the lower end part of the left side portion 1161 at a right angle and opposes to the upper side portion 1162.

The protruding portion for fixing 213a which is formed at left end part of upper of the liquid crystal module 2, and the protruding portion for fixing 213b which is formed at central part of left side of the liquid crystal module 2 are formed with high accuracy as designed with respect to the effective display area. Further, the first positioning rib 115 and the second positioning rib 116 are formed with high accuracy as designed with respect to the window portion 110.

The liquid crystal module 2 is arranged such that the upper part of the protruding portion for fixing 213a may contact with the first positioning rib 115, and the left end part and the upper and lower end part of the protruding portion for fixing 213b may contact with the second positioning rib 116. By arranging as above described, the liquid crystal module 2 is arranged such that the effective display area is exposed from the window portion 110 of the front cabinet 11 with high accuracy. In this state, all the protruding portions for fixing 213 are fastened by screws with the screw holes 114 in the protruding portions 113 of the front cabinet 11, and the liquid crystal module 2 is fixed as a result on the front cabinet 11 in a state where positional accuracy is high.

In the embodiment described above, the liquid crystal display device is explained in which the protruding portion for fixing 213a which is formed on left end part of upper part of the liquid crystal module 2 and protruding portion for fixing 213b which is formed on central part of left side of the liquid crystal module 2 are contacted to perform positioning, however, the present invention is not limited to the embodiment. The present invention may have the positioning rib which contacts with much more protruding portions for fixing 213.

In the liquid crystal display device A in accordance with the present invention, the protruding portion for fixing 213a is contacted with the first positioning rib 115, the protruding portion for fixing 213b is contacted with the second positioning rib 116, the liquid crystal module 2 is pushed toward a corner part between the protruding portion for fixing 213a and the protruding portion for fixing 213b, and the liquid crystal module 2 is consequently positioned at an appropriate position with respect to the front cabinet 11.

Further, even in case where the liquid crystal display device A in a packaging material falls and the corner part between the protruding portion for fixing 213a and the protruding portion for fixing 213b is impacted, because the protruding portion for fixing 213a and the protruding portion for fixing 213b are received by the first positioning rib 115 and the second positioning rib 116, a force which is applied to the corner part of the liquid crystal module 2 can be distributed. And a force which is applied to the liquid crystal cell 22 of the liquid crystal module 2 can be consequently distributed, and it becomes possible to prevent occurrence of problems such as deforming, breakage, and the like of the liquid crystal cell 22.

As above described, the embodiment of the present invention is concretely explained, however, the present invention is not intended to be limited to the above described embodiment, and various modification can be introduced to the present invention without departing scope and spirit of the present invention.

The present invention can be applied to accurate positioning of the liquid crystal module.

What is claimed is:
1. A liquid crystal display device which displays an image, comprising:
    a liquid crystal module in which a liquid crystal cell is arranged in a rear frame that is made by metal and has a rectangular box shape;

a front cabinet which has a rectangular frame shape and has in a central part thereof a window portion from which a display portion of the liquid crystal cell is exposed;

a rear cabinet that fastens to the front cabinet to enclose the rear frame and liquid crystal module; and a plurality of protruding portions for fixing which have a rectangular shape, protruding outwardly from side surfaces that form shorter sides and longer sides of the rear frame, and fastened on to the front cabinet by screws, wherein the front cabinet includes at a back surface side thereof:

a surrounding rib which has a predetermined height from the back surface perpendicularly thereto and which is formed so as to surround the window portion, a first positioning rib which contacts at least one of the protruding portions for fixing that protrudes from one of the longer sides of the rear frame, and has at least one side parallel to said one of the longer sides, and a second positioning rib which contacts at least one of the protruding portions for fixing that protrudes from one of the shorter sides of the rear frame, and has at least one side parallel to said one of the shorter sides, and the first and second positioning ribs are formed with a length greater than the length of the surrounding rib when measured from an opposing position on a longitudinal or a transverse axis of the window portion, and inner walls of both the first and second positioning ribs protrude longer than the surrounding rib so as to make contact with an edge portion of the protruding portions for fixing, wherein the first and second positioning ribs are contiguous with the surrounding rib.

2. The liquid crystal display device according to claim 1, wherein the second positioning rib is formed in a U shape so as to contact with three sides of an outermost part of the one of the protruding portions for fixing.

3. The liquid crystal display device according to claim 2, wherein the first positioning rib is formed so as to contact one of the protruding portions for fixing that is adjacent to a corner part of the rear frame, and the second positioning rib is formed so as to contact one of the protruding portions for fixing that is formed so as to be adjacent to the first positioning rib to sandwich the corner part.

4. The liquid crystal display device according to claim 1, wherein the first positioning rib is formed so as to contact one of the protruding portions for fixing that is adjacent to a corner part of the rear frame, and the second positioning rib is formed so as to contact one of the protruding portions for fixing that is formed so as to be adjacent to the first positioning rib to sandwich the corner part.

5. The liquid crystal display device according to claim 1, wherein the protruding portions for fixing are U-shaped, the first positioning rib is U-shaped, and an entire inner surface of the first positioning rib makes contact with an edge portion of the protruding portion for fixing.

6. The liquid crystal display device according to claim 1, wherein the protruding portions for fixing are U-shaped, the second positioning rib is rectangular in shape, and an entire inner surface of the first positioning rib, except at corners, makes contact with an edge portion of the protruding portion for fixing.

* * * * *